(No Model.) 2 Sheets—Sheet 1.
H. D. WINTON.
LEADING PIECE FOR OVERHEAD ELECTRIC RAILWAYS.
No. 492,881. Patented Mar. 7, 1893.
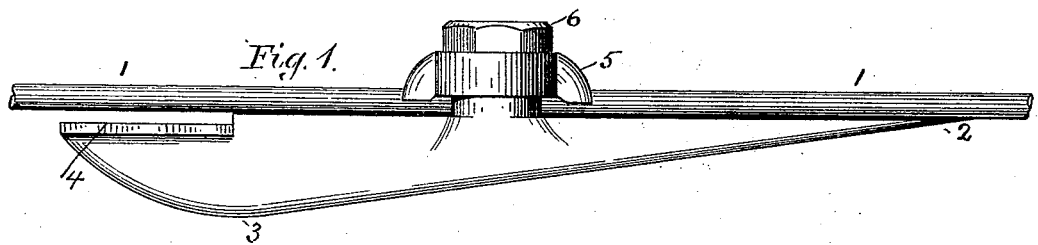
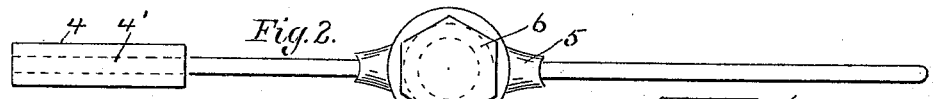
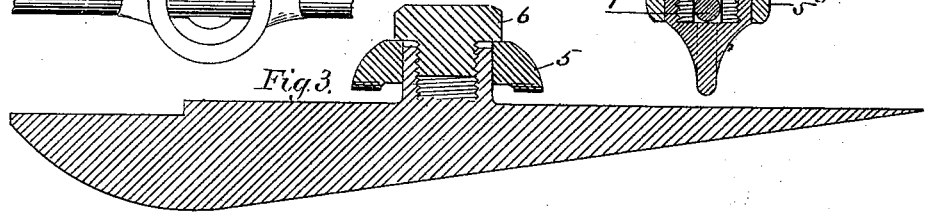
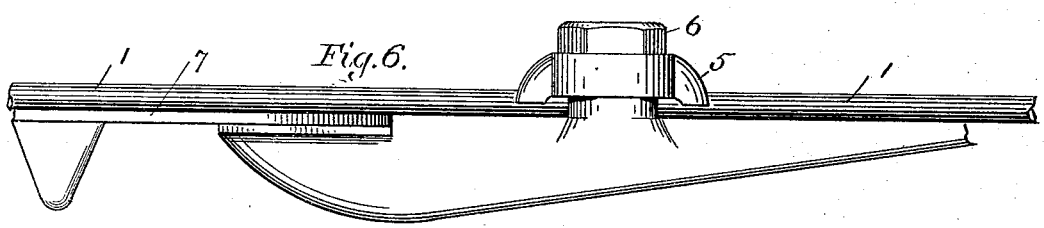
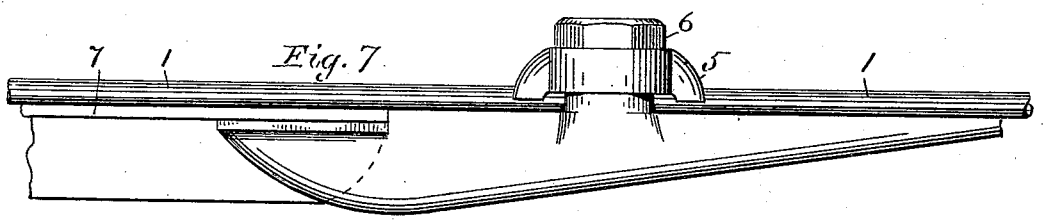
Witnesses:
Wm J Smith
F H Walsh
Inventor
Henry D Winton (No Model.) 2 Sheets—Sheet 2.
H. D. WINTON.
LEADING PIECE FOR OVERHEAD ELECTRIC RAILWAYS.
No. 492,881. Patented Mar. 7, 1893.
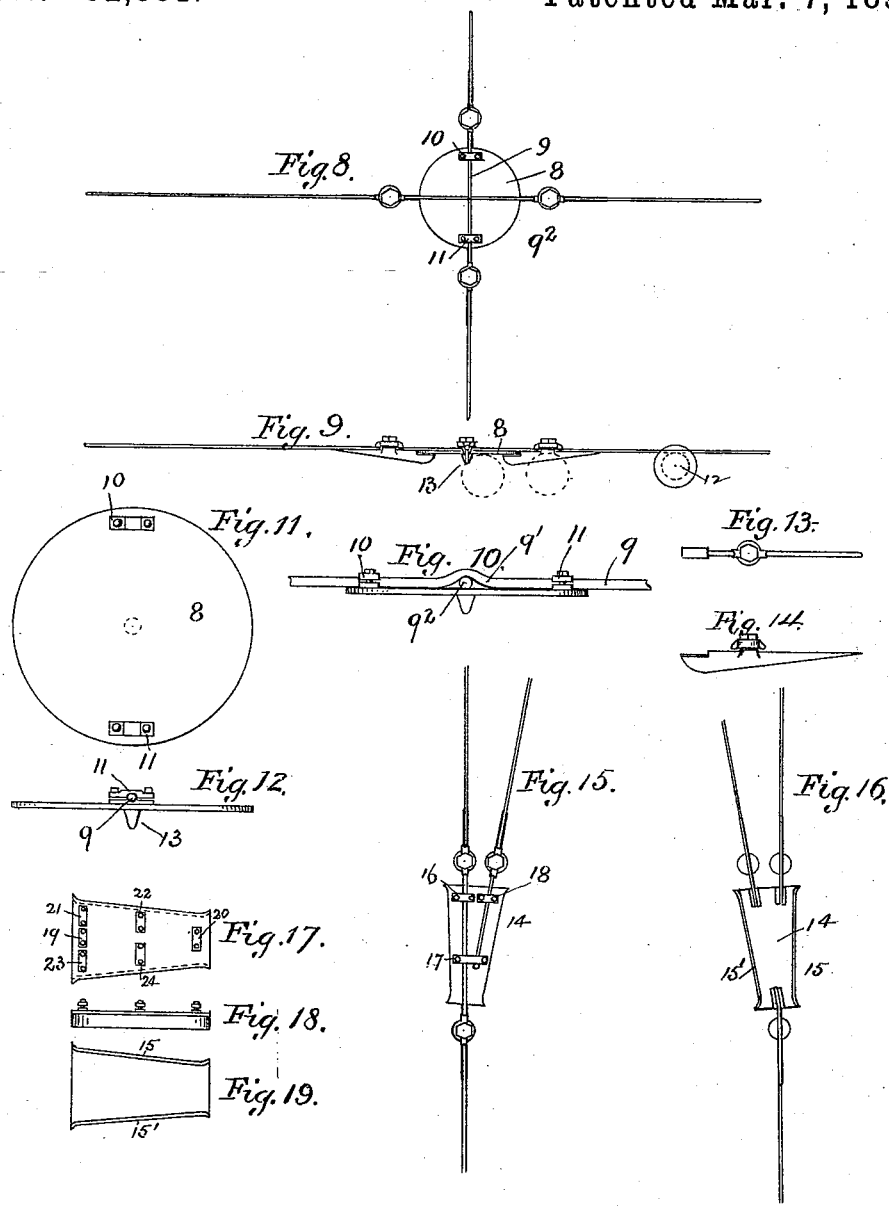

UNITED STATES PATENT OFFICE.

HENRY D. WINTON, OF WELLESLEY, MASSACHUSETTS, ASSIGNOR TO THE HERSEY MANUFACTURING COMPANY, OF PORTLAND, MAINE, AND OF BOSTON, MASSACHUSETTS.

LEADING-PIECE FOR OVERHEAD ELECTRIC RAILWAYS.

SPECIFICATION forming part of Letters Patent No. 492,881, dated March 7, 1893.

Application filed June 20, 1892. Serial No. 437,391. (No model.)

*To all whom it may concern:*

Be it known that I, HENRY D. WINTON, a citizen of the United States, residing at Wellesley, in the county of Norfolk and State of Massachusetts, have invented a new and useful Improvement in Leading-Pieces for Overhead Electric Railway Switches and Crossings, of which the following is a full, clear, and exact description, reference being had to the accompanying drawings, forming a part of this specification, in explaining its nature.

This invention relates to a leading device for use in directing trolley wheels on overhead electric railways at crossings, junctions, switches and other points where it is desired to diverge or pass over or to and from one line to another.

It consists mainly in independent leading pieces which can be strapped or bolted to an electric trolley wire so that it will clamp upon plates or disks in such a manner that the trolley wheel will be directed upon these plates or disks and diverted from one wire to another wire, or from one wire by another so that lines running in opposite directions may be crossed easily, or the wheel may be switched from one wire to another.

In the drawings Figure 1 is a side view of one of these leading pieces attached to the trolley wire. Fig. 2 is a plan view of the same. Fig. 3 is a sectional view through the same. Fig. 4 is a plan view of the clamping device showing the nut removed. Fig. 5 is a cross section through the clamping portion. Fig. 6 is a view of one of these leading pieces clamped to the wire and also to a portion of a disk plate. Fig. 7 is a similar view clamped to a portion of a box plate. Fig. 8 is a plan view showing the application of my improvement to a cross-over. Fig. 9 is a side view of the same. Fig. 10 is a side view of a disk secured to the trolley wires ready to receive the leading pieces. Fig. 11 is a plan view of the same. Fig. 12 is an end view of the same. Figs. 13 and 14 are two views of the leading piece not connected with the wires. Figs. 15 and 16 represent a top and bottom view of a two-way switch. Figs. 18, 19 and 20 represent a box casting for a three way switch. Figs. 17, 18 and 19 illustrate a box adapted for a three-way switch.

Referring to Fig. 1, I form what I term a leading piece of the general shape shown, which slants from a point 2 at its junction with the trolley wire 1 to a point 3, which is low enough to allow the outer edge of the flange of the trolley wheel to engage with a plate which is clamped between the trolley wire 1 and a portion 4 of the leader so that it will roll gently from the bottom of the leader on to the plate. This leading piece is clamped to the wire as shown, by means of a projected stud having a yoke 5 which partially encircles the wire, and a threaded nut 6 which screws into the threaded portion of the slotted stud so that by screwing this bolt down the wire will be firmly clamped and the leading piece securely fastened to the wire.

It will be seen by reference to Fig. 3 that I make a yoke so that the tighter the bolt is screwed the tighter it will bind the wire. These leading pieces can be secured to a wire at any point desired, and by placing it against a plate as shown at 7, the wheel will be guided directly on to this plate and from this plate to any other point it is desired. The plates to which these may be clamped can be of different shapes and forms suited to the purpose, as will be shown farther on. I further provide at the end of this leading piece a flat surface 4', (referring to Fig. 2) which will clamp against the bottom side of the plate to prevent the leading piece from tipping; in case the trolley should drag sidewise with any degree of strain, the leading piece cannot turn upon the wire on account of the flat piece, as here described.

Referring to Fig. 8, it will be seen that it is desired to have a trolley wheel cross upon wires placed at right angles to each other, and in order that the trolley may run smoothly by the wires I apply my leading device as follows: I secure a plate 8 to the upper wire 9 by means of two straps 10 and 11, better shown in Figs. 11 and 12. Before securing this plate by clamps I make a slight kink 9' in the center of the wire the depth of the thickness of the wire $9^2$, which crosses it so that while it is clamped to the circular disk piece the wire running in the opposite direction is firmly held in place by the upper kinked wire, as will be better seen in Fig. 10. Having secured the plate 8 to the cross wire in the manner described, I then secure by means of the yoke and bolt one of my leaders to each wire in the manner shown in Figs. 8 and 9. It will be seen that when a trolley wheel 12 is passing over a wire as indicated in Fig. 9, the wheel is guided down the inclined leading piece on to the plate 8, in the center of which is a stud 13, which prevents the wheel from running off the plate and it passes over on to the other leading piece and off on to the wire again. The same operation will take place upon the wire running in the opposite direction. It will easily be seen that these independent leading pieces can be placed on wires at any angle. Frequently the wires passing through different streets vary greatly in the angle of their crossing and by having these independent leading pieces I can attach the plate to one of the wires without disturbing their angle and clamp the leading piece to the wire precisely as they stand; in this way I avoid having to make special cross-overs for particular angles. In the same way, referring to Figs. 15 and 16, I can make a box-shaped casting 14, which is formed with downwardly projecting sides 15 and 15', and this box casting I secure to the main trolley wire by clamps 16, 17, and I attach the switch wire, or the wire which leads away, by means of the clamps 17 and 18. I then attach my leading pieces to each of these wires so that if the trolley is passing over the main line it will have a perfectly straight run over the leading piece on to the box and off on to the main wire again. If, however, it is desired to switch off on to the side wire, the car being a considerable distance in the lead of the trolley, when it comes upon the leading piece and is guided on to the box, it will drag over to one side and will consequently take the leading piece that branches off the main wire. The side pieces 15, 15' prevent the trolley from getting off the plate and whichever way the wheel is directed by means of the car, it will naturally take the leader toward which it is crowded. In this way I am enabled to get a very perfectly operating switch by just clamping these leading pieces on to the plate as herewith described.

In Figs. 17, 18 and 19 I show three views of a box adapted for a three-way switch. The box in this event would be secured by a clamp 19, 20, and the branch wires by clamps 21, 22, 23 and 24, and I then attach my leading pieces as heretofore described.

I have shown and described that form of leading piece which I have preferably made, but it is sometimes necessary where large trolley wheels are used and made with deep grooves, that the leaders be made much longer, and in such event in order to prevent the end 2 (referring to Fig. 1) from bending out of place by the pressure of the wheel, I may provide two or more clamps to secure it to the wire. It is also sometimes preferable where extra large leading pieces are used, to solder them to the wire to give additional strength, and when they are so made I prefer to have them conform somewhat to the shape of the wire on the top side in order to provide a soldering surface.

These various modifications may be made without departing from the spirit of my invention. The forms illustrated, however, are those which I have so far used with satisfaction.

Having fully set forth my improvements, what I desire to claim and secure by Letters Patent is—

1. The combination in a trolley guiding device of the character set forth, of one or more independent leading pieces adapted for attachment to the wires of overhead electric railway lines, and a plate adapted to be secured to said overhead lines, forming a guide for a trolley wheel whereby a change of direction may be given to the trolley from one wire to another, substantially as described.

2. The combination in a trolley guiding device of the character set forth, of one or more independent leading pieces adapted for attachment to the wires of overhead electric railway lines, and a plate adapted to be secured to said overhead lines and provided with depending sides or studs, forming a guide for a trolley wheel whereby a change of direction may be given to the trolley from one wire to another, substantially as described.

3. The combination in a trolley guiding device of the character set forth, of one or more independent leading pieces adapted for attachment to the wires of overhead electric railway lines, and a plate adapted for attachment to said overhead lines, provided with depending sides forming a guide for a trolley wheel whereby a change of direction may be given to the trolley from one wire to another, substantially as described.

4. The combination in a trolley guiding device of the character set forth, of one or more independent leading pieces adapted for attachment to the wires of an overhead electric line, and a plate adapted for attachment to said overhead line, provided with a central stud, forming a guide for a trolley wheel whereby a change of direction may be given to the trolley from one wire to another, substantially as described.

5. The combination in a trolley guiding device of the character set forth, of one or more independent leading pieces adapted for attachment to the wires of overhead electric railway lines, and a plate provided with clamps for attaching it to the overhead line, and provided with depending sides or studs, forming a guide for a trolley wheel whereby a change of direction may be given to the trolley from one wire to another, substantially as described.

6. The combination in a trolley guiding device of the character set forth, of one or more leading pieces provided with clamps for securing the same to overhead electric railway lines, and a plate provided with depending sides or studs forming a guide for a trolley wheel whereby a change of direction may be given to the trolley from one wire to another, substantially as described.

7. The combination in a trolley guiding device of the character set forth, of one or more independent leading pieces provided with clamps for attaching the same to the wires of overhead electric railway lines, and a plate provided with clamps for securing it to said lines, and having depending sides or studs forming a guide for a trolley wheel whereby a change of direction may be given to the trolley from one wire to another, substantially as described.

8. The combination in a trolley guiding device of the character set forth, of one or more leading pieces provided with clamps for attaching the same to overhead electric lines, and a depression at one end, and a plate adapted to fit into said depression to prevent the leading pieces from turning or crowding forward, and provided with depending sides or studs forming a guide for a trolley wheel whereby a change of direction may be given to the trolley from one wire to another, or from one wire by another, substantially as described.

9. The combination in a trolley guiding device of the character set forth, of one or more independent leading pieces of tapering form and provided with clamps for securing the same to overhead electric railway lines, and provided with a depression at one end, a plate adapted to fit into said depression and provided with clamps for securing it to said overhead lines and having depending sides or studs forming a guide for a trolley wheel whereby a change of direction may be given to the wheel from one wire to another or from one wire by another, substantially as described.

10. The combination in a trolley guiding device of the character set forth, of one or more leading pieces composed of wedge-shaped ribs provided with a slotted stud to receive a trolley wire, and a yoke adapted to clamp the trolley wire and fit over said stud, and a threaded nut formed to fit the slotted stud so as to clamp the said leading pieces to the trolley wire, and a flattened depression at one end, and a plate adapted to fit said depression to prevent the leading pieces from turning on the wire and to prevent their crowding forward, said plate being provided with depending sides forming a guide for a trolley wheel, and having clamps for securing it to the trolley wires, the whole forming a built up switch, frog or crossing capable of transformation and forming a guide for a trolley wheel whereby its direction may be changed from one wire to another, or from one wire by another, substantially as described.

HENRY D. WINTON.

Witnesses:
WM. J. SMITH,
C. E. BARKER.